US009191084B2

(12) United States Patent
Bao et al.

(10) Patent No.: US 9,191,084 B2
(45) Date of Patent: Nov. 17, 2015

(54) METHOD AND DEVICE FOR REALIZING MULTI-INPUT MULTI-OUTPUT

(75) Inventors: Dongshan Bao, Beijing (CN); Huijuan Yao, Beijing (CN); Jiaqing Wang, Beijing (CN); Xiaoyan Yu, Beijing (CN); Shenfa Liu, Beijing (CN); Zhigang Yan, Beijing (CN)

(73) Assignee: BEIJING NUFRONT MOBILE MULTIMEDIA TECHNOLOGY CO., LTD, Beijing (CN)

( * ) Notice: Subject to any disclaimer, the term of this patent is extended or adjusted under 35 U.S.C. 154(b) by 103 days.

(21) Appl. No.: 13/981,475

(22) PCT Filed: Jan. 16, 2012

(86) PCT No.: PCT/CN2012/070369
§ 371 (c)(1),
(2), (4) Date: Sep. 12, 2013

(87) PCT Pub. No.: WO2012/100691
PCT Pub. Date: Aug. 2, 2012

(65) Prior Publication Data
US 2014/0044069 A1    Feb. 13, 2014

(30) Foreign Application Priority Data

Jan. 30, 2011 (CN) .......................... 2011 1 0033161
Jul. 6, 2011 (CN) .......................... 2011 1 0188947

(51) Int. Cl.
*H04B 7/00* (2006.01)
*H04B 7/04* (2006.01)
(Continued)

(52) U.S. Cl.
CPC ............ *H04B 7/0417* (2013.01); *H04B 7/0689* (2013.01); *H04L 1/0675* (2013.01);
(Continued)

(58) Field of Classification Search
CPC .... H04W 72/04; H04W 72/042; H04W 72/08
USPC .................................. 370/310, 328, 329, 349
See application file for complete search history.

(56) References Cited

U.S. PATENT DOCUMENTS

| 7,804,800 | B2* | 9/2010 | Li et al. .......................... 370/334 |
| 8,073,069 | B2* | 12/2011 | Mundarath et al. ........... 375/267 |
| 8,200,164 | B2* | 6/2012 | Trainin et al. .................... 455/69 |
| 8,249,204 | B2* | 8/2012 | Wu et al. ........................ 375/346 |
| 8,531,958 | B2* | 9/2013 | Sivanesan et al. ............. 370/235 |
| 8,737,504 | B2* | 5/2014 | Liu et al. ........................ 375/267 |
| 8,867,495 | B2* | 10/2014 | Farajidana et al. ............ 370/334 |

(Continued)

FOREIGN PATENT DOCUMENTS

| CN | 101399589 | 4/2009 |
| CN | 101416417 | 4/2009 |
| CN | 101626588 | 1/2010 |

OTHER PUBLICATIONS

IEEE standard for IT, Part 11: wireless LAN MAC and PHY, Amendment 5, IEEE, Oct. 2009, pp. 1-536.*

*Primary Examiner* — Dmitry H Levitan
(74) *Attorney, Agent, or Firm* — Fay Kaplun & Marcin, LLP

(57) ABSTRACT

A method is for realizing Multi-Input Multi-Output which includes steps of: sending, by a Central Access Point, a downlink sounding channel, Multi-Input Multi-Output (MIMO) control information, and a feedback resource indicator to a Station (STA); detecting, by the STA, the downlink detection channel to obtain channel information, and feeding back on the feedback resource according to the indication of the MIMO control information; and selecting, by the Central Access Point, a suitable MIMO mode for downlink data transmission according to the feedback of the STA.

10 Claims, 7 Drawing Sheets

(51) Int. Cl.
*H04L 1/06* (2006.01)
*H04L 5/00* (2006.01)
*H04B 7/06* (2006.01)

(52) U.S. Cl.
CPC ............ *H04B7/0626* (2013.01); *H04B 7/0639* (2013.01); *H04B 7/0643* (2013.01); *H04B 7/0645* (2013.01); *H04L 5/0023* (2013.01); *H04L 5/0053* (2013.01); *H04L 5/0091* (2013.01)

(56) References Cited

U.S. PATENT DOCUMENTS

| 2007/0147536 | A1* | 6/2007 | Melzer et al. ................. 375/267 |
| 2008/0165875 | A1 | 7/2008 | Mundarath et al. |
| 2009/0034639 | A1* | 2/2009 | Hwang et al. ................. 375/260 |
| 2010/0238824 | A1 | 9/2010 | Farajidana et al. |
| 2011/0200127 | A1* | 8/2011 | Lee et al. ...................... 375/260 |
| 2012/0039199 | A1* | 2/2012 | Chen et al. ................... 370/252 |

* cited by examiner

METHOD AND DEVICE FOR REALIZING MULTI-INPUT MULTI-OUTPUT

CROSS-REFERENCE TO RELATED APPLICATION

This application claims the priority of Chinese patent application No. 201110033161.7 filed on Jan. 30, 2011 and titled "COMMUNICATION METHOD AND WIRELESS COMMUNICATION SYSTEM FOR REALIZING MULTI-INPUT MULTI-OUTPUT", which is incorporated herein by reference in its entirety.

This application claims the benefit of Chinese patent application No. 201110188947.6 filed on Jul. 6, 2011 and titled "COMMUNICATION METHOD, WIRELESS COMMUNICATION SYSTEM AND DEVICE FOR REALIZING MULTI-INPUT MULTI-OUTPUT", which is incorporated herein by reference in its entirety.

FIELD OF THE INVENTION

The present invention relates to the field of wireless communications and network technologies, and in particular, to a method and device for realizing Multi-Input Multi-Output (MIMO).

BACKGROUND OF THE INVENTION

With the rapid development of wireless communication technologies, the severe shortage of spectrum resources has increasingly been a "bottleneck" for the development of the wireless communication industry. Currently, one of the hot research subjects in the communication industry is to fully develop and exploit the limited spectrum resources and improve the spectrum utilization. The multi-antenna technology is much preferred due to its ability to improve transmission efficiency and spectrum utilization without increasing the used bandwidth.

With the rapid development of communication technologies, it is more demanding for the method for realizing the MIMO mechanism.

SUMMARY OF THE INVENTION

In view of the above, the technical problem to be solved by the invention is to provide a novel method for realizing a MIMO mechanism. A brief summary is given below to provide a basic understanding of some aspects of the embodiments disclosed. This section of summary is not to provide a general commentary, or to determine the key/important elements or to describe the protection scopes of these embodiments, but is merely to simply present some concepts, which act as a preamble of the subsequent detailed illustration.

To solve the above technical problem, the invention provides a method for realizing Multi-Input Multi-Output, including:

sending, by an access point (AP), a channel sounding frame to a specified user station, where the sounding frame carries Multi-Input Multi-Output (MIMO) control information which includes a channel information type, channel bandwidth and subcarrier grouping information that are required to be fed back by the user station;

feeding back channel information to the AP by the user station after receiving the sounding frame, according to the MIMO control information in response to a request of the AP; and receiving, by the AP, the channel information fed back by each station, determining a MIMO operating mode according to the channel information fed back, and sending data to the corresponding station.

In some optional embodiments, a feedback type request includes that the channel information type requested to be fed back is a channel state information (CSI) report for Single User-MIMO or Multi User-MIMO, and the MIMO control information further includes:

an index Nc, which is used as the number of columns of a CSI matrix;

an index Nr, which is used as the number of rows of a CSI matrix; and quantization bit information, which represents the number of quantization bits of the real part and the imaginary part of each element in a CSI matrix.

In some optional embodiments, the feedback type request further includes a codebook matrix feedback, for the feedback of multi-user MU-MIMO.

In some optional embodiments, if the AP requests for a MU-MIMO feedback, stations with the same bandwidth capacity employ an OFDMA mode for feedback, and stations with different bandwidth capacities employ a TDMA mode for feedback.

In some optional embodiments, the feedback type is a CSI matrix feedback or a codebook feedback; the channel information fed back by the station is packaged and sent in a MAC frame, the MAC frame contains a MAC frame header and a frame body, where the frame body contains a CSI matrix report or a codebook matrix report;

If the feedback type is a CSI matrix, the frame body fed back by the station contains a CSI matrix report field, which contains the channel quality information (CQI) of each receiving antenna and a CSI matrix of each data subcarrier or data subcarrier group;

If the feedback type is a codebook feedback, the frame body fed back by the station includes:

CQI of each space-time stream; and a codebook matrix identity of each data subcarrier or data subcarrier group.

In some optional embodiments, the CSI matrix report field includes a CSI matrix element, and is sorted according to the sequence number of the data subcarrier.

To solve the above technical problem, the invention further provides medium-range and short-range wireless communication systems for realizing MIMO, including:

an AP, for sending a channel sounding frame to a specified user station and indicating the user station to feed back the channel information, where the sounding frame carries MIMO control information including a channel information type, channel bandwidth and subcarrier grouping information that are required to be fed back; and if the AP sends a MU-MIMO channel sounding frame, the MIMO control information contains the MIMO control information of a plurality of stations;

after receiving the sounding frame, the user station feeds back the channel information to the AP according to the MIMO control information;

the AP receives the channel information fed back by each user station, determines the MIMO operating mode according to the channel information fed back, and sends data to the corresponding user station.

In some optional embodiments, if the AP requests for a MU-MIMO feedback, user stations with the same bandwidth capacity employ the OFDMA mode for feedback, and user stations with different bandwidth capacities employ the TDMA mode for feedback.

To solve the above technical problem, the invention further provides a method for realizing Multi-Input Multi-Output, including:

sending, by a CAP, a downlink sounding channel, MIMO control information and a feedback resource indication to an STA;

detecting, by the STA, the downlink sounding channel to obtain channel information, and feeding back via the feedback resource according to the indication of the MIMO control information; and selecting, by the CAP, a suitable MIMO mode for downlink data transmission according to the feedback of the STA.

In some optional embodiments, the MIMO control information includes an identity (ID) of the STA.

In some optional embodiments, the MIMO control information includes the type of feedback requested and a feedback parameter.

In some optional embodiments, the type of feedback requested is a channel state information (CSI) feedback, and the feedback parameter is the number of rows of a CSI matrix.

In some optional embodiments, the STA feeds back a CSI report, which contains the average channel quality information (CQI) of each receiving antenna and a CSI matrix of each data subcarrier or data subcarrier group.

In some optional embodiments, the type of feedback requested is a beamforming matrix (BFM) feedback, and the feedback parameter is the number of columns of the BFM.

In some optional embodiments, the STA feeds back a BFM report, which contains the average CQI of each space-time stream and a beamforming matrix of each data subcarrier or data subcarrier group.

In some optional embodiments, the type of feedback requested is a codebook matrix index (CMI) feedback.

In some optional embodiments, the STA feeds back a CMI report, which contains the average CQI of each space-time stream and a codebook matrix identity of each data subcarrier or data subcarrier group.

In some optional embodiments, the STA further feeds back MIMO feedback control information.

In some optional embodiments, the MIMO feedback control information includes one or more of:

a subchannel mapping indication, for indicating the bandwidth of a MIMO feedback subchannel and the specific corresponding subchannel sequence number;

a quantization mode, for indicating a quantization mode under each feedback mode; and subcarrier grouping, for indicating the number of subcarriers in a group.

In some optional embodiments, the CAP allocates a feedback resource to the STA, where feedback resources are allocated to STAs with the same bandwidth capacity based on the OFDMA mode, and feedback resources are allocated to STAs with different bandwidth capacities based on the TDMA mode.

To solve the above technical problem, the invention further provides a central access point, comprising:

a sending module, for sending a downlink sounding channel, MIMO control information and a feedback resource indication to an STA;

a receiving module, for receiving a feedback of the STA; and a processing module, for selecting a suitable MIMO mode for downlink data transmission according to the feedback of the STA.

In some optional embodiments, the MIMO control information includes an identity of the STA.

In some optional embodiments, the MIMO control information includes the type of feedback requested and a feedback parameter.

In some optional embodiments, the type of feedback requested is a CSI feedback, and the feedback parameter is the number of rows of a CSI matrix.

In some optional embodiments, the receiving module is adapted to receive a CSI report fed back by the STA, and the CSI report contains the average CQI of each receiving antenna and a CSI matrix of each data subcarrier or data subcarrier group.

In some optional embodiments, the type of feedback requested is a BFM feedback, and the feedback parameter is the number of columns of the BFM.

In some optional embodiments, the receiving module is adapted to receive a BFM report fed back by the STA, and the BFM report contains the average CQI of each space-time stream and a beamforming matrix of each data subcarrier or data subcarrier group.

In some optional embodiments, the type of feedback requested is a CMI feedback.

In some optional embodiments, the receiving module is adapted to receive a CMI report fed back by the STA, and the CMI report contains the average CQI of each space-time stream and a codebook matrix identity of each data subcarrier or data subcarrier group.

In some optional embodiments, the central access point further includes:

an allocating module, for allocating a feedback resource to the STA, where feedback resources are allocated to STAs with the same bandwidth capacity based on an OFDMA mode, and feedback resources are allocated to STAs with different bandwidth capacities based on a TDMA mode.

To solve the above technical problem, the invention further provides a station, including:

a receiving module, for receiving a downlink sounding channel, MIMO control information and a feedback resource indication sent by a CAP;

a detecting module, for detecting the downlink sounding channel to obtain the channel information; and a feedback module, for feeding back via the feedback resource according to the indication of the MIMO control information.

In some optional embodiments, the MIMO control information received by the receiving module includes the identity of the STA.

In some optional embodiments, the MIMO control information received by the receiving module includes the type of feedback requested and a feedback parameter.

In some optional embodiments, when the type of feedback requested, which is received by the receiving module, is a CSI feedback, the feedback parameter is the number of rows of a CSI matrix.

In some optional embodiments, the feedback module is adapted to feed back a CSI report, which contains the average CQI of each receiving antenna and a CSI matrix of each data subcarrier or data subcarrier group.

In some optional embodiments, when the type of feedback requested, which is received by the receiving module, is a BFM feedback, the feedback parameter is the number of columns of the BFM.

In some optional embodiments, the feedback module is adapted to feed back a BFM report, which contains the average CQI of each space-time stream and a beamforming matrix of each data subcarrier or data subcarrier group.

In some optional embodiments, the type of feedback requested, which is received by the receiving module, is a CMI feedback.

In some optional embodiments, the feedback module is adapted to feed back a CMI report, which contains the average CQI of each space-time stream and a codebook matrix identity of each data subcarrier or data subcarrier group.

In some optional embodiments, the feedback module is adapted to feed back MIMO feedback control information.

In some optional embodiments, the MIMO feedback control information includes one or more of:

a subchannel mapping indication, for indicating the bandwidth of a MIMO feedback subchannel and the specific corresponding subchannel sequence number;

a quantization mode, for indicating a quantization mode under each feedback mode; and subcarrier group, for indicating the number of subcarriers in a group.

As can be seen, with the technical solutions for realizing MIMO according to the invention, a CAP can implement an overall schedule on channel resources, to enable a user station to further multiplex the space resources, thereby improving the spectrum utilization. The solutions of the invention allow the adaptive schedule of spectrum resources, thus improving spectrum utilization and system performance.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

DETAILED DESCRIPTION OF THE EMBODIMENTS

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

A First Embodiment

In some optional embodiments, the MIMO operating mode of a system may be divided into a Single User-MIMO (SU-MIMO) and a Multi User-MIMO (MU-MIMO), depending on system capacities and operating scenes. The operating mode of SU-MIMO may be an open-loop mode or a closed-loop mode, and may be further categorized into space diversity, beamforming and space multiplexing according to the MIMO operating mode.

The first embodiment of the invention provides a method for realizing a closed-loop MU-MIMO operating mode.

Due to the difference between uplink and downlink operating capacities, only SU-MIMO is supported in the uplink, but both the SU-MIMO and MU-MIMO are supported in the downlink, as shown in Table 1.

TABLE 1

| MIMO mode | | | MIMO Operating Mode | |
|---|---|---|---|---|
| downlink (DL) | SU-MIMO | open-loop | transmission diversity STBC space multiplexing | generally at most 8 streams |
| | | Closed-loop | beamforming | |
| | MU-MIMO | | Closed-loop | generally at most 4 users |
| uplink (UL) | SU-MIMO | | Open-loop | generally at most 4 streams |

The selection of a downlink MIMO operating mode according to an embodiment of the invention will be described below.

Figure 1:
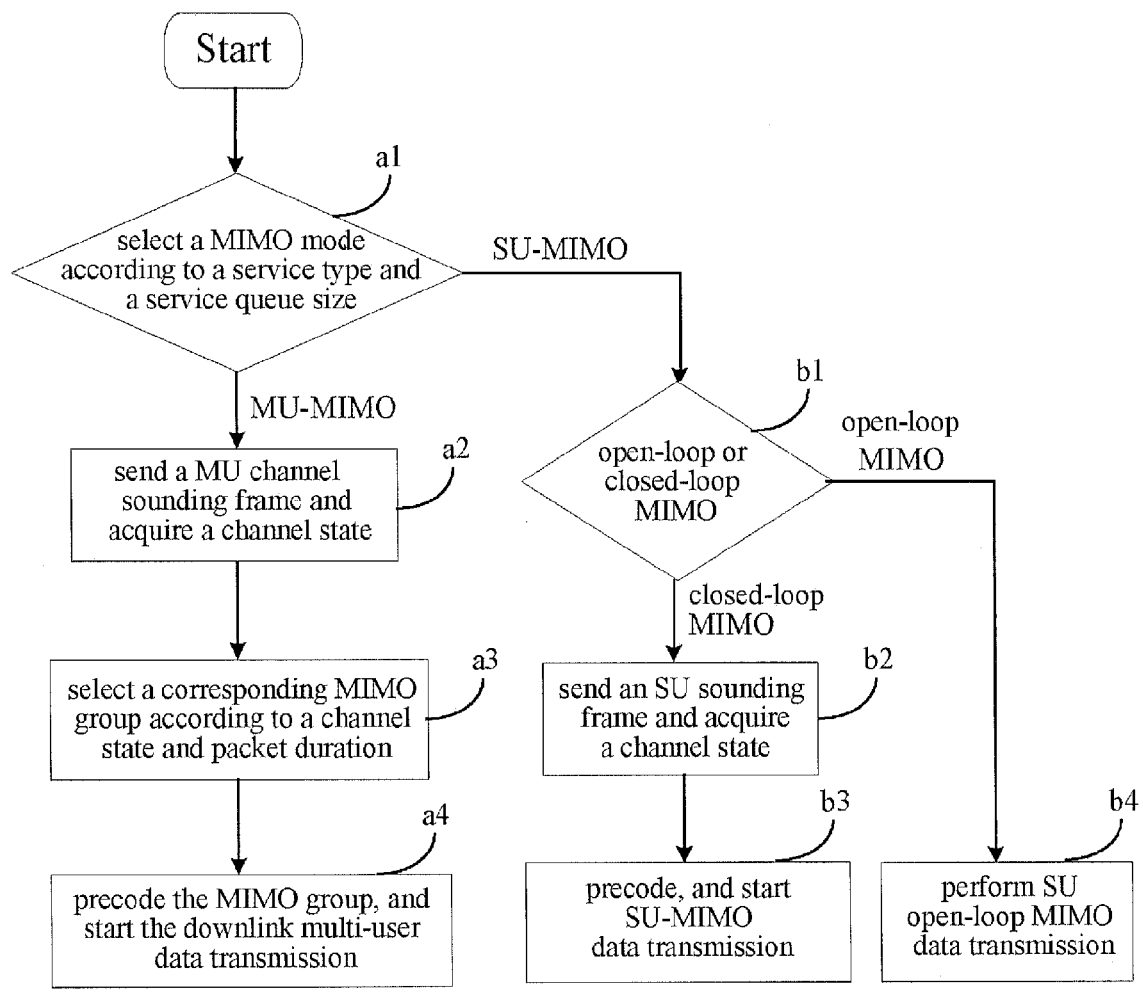
FIG. 1 is a schematic flow chart of downlink MIMO mode selection according to a first embodiment of the invention.

For the downlink operating, a CAP may determine to operate in the SU-MIMO mode or the MU-MIMO mode according to the known capacity of a User Equipment (for example, a beamforming (BF)/Space Time Block Code (STBC) capacity), the currently buffered service level, the queue size and the available system resources. As shown in FIG. 1, the specific flow is as follows:

Step a1: The SU-MIMO mode or the MU-MIMO mode is selected as an operating mode according to the service type and the service queue size.

If the MU-MIMO mode is employed, the following Steps a2-a4 are conducted.

Step a2: A multi-user channel sounding frame (MU-Sounding) is sent and the channel state is acquired;

Step a3: A corresponding MIMO group is selected according to parameter fed back, for example, channel state information, packet duration, etc.;

Step a4: Precoding is performed on the MIMO group, and the downlink multi-user data transmission is initiated.

If the SU-MIMO mode is employed, the following Steps b1-b4 are conductd.

Step b1: It is determined whether the closed-loop MIMO mode or the open-loop MIMO mode is employed. If the closed-loop MIMO mode is employed, Step b2 is performed; and if the open-loop MIMO mode is employed, Step b4 is performed.

Step b2: a single-user sounding frame is sent, and the channel state is acquired.

Step b3: precoding is performed, and Single User-MIMO data transmission is initiated.

Step b4: single-user open-loop MIMO data transmission is performed.

Second Embodiment

Figure 2:
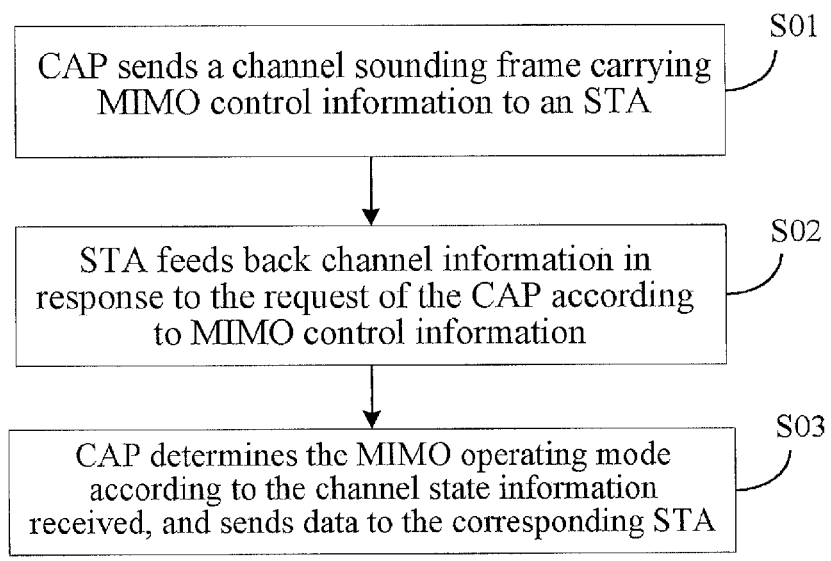
FIG. 2 is a flow chart of a method for realizing MIMO according to a second embodiment of the invention.

Referring to FIG. 2, the second embodiment of the invention proposes a method for realizing MIMO in medium-range and short-range wireless communication systems, including the following Steps S01-S03.

At Step S01, a CAP sends a channel sounding frame to each station (STA) in a unicast or broadcast mode for channel sounding, and requests the STA to feed back channel information, with the request carrying MIMO control information. If the channel sounding frame is sent in the unicast mode, the MIMO control information includes one or more of: a channel information type, channel bandwidth and subcarrier grouping information to be fed back. If the CAP sends a MU-MIMO channel sounding frame in the broadcast mode, the MIMO control information contains MIMO control information of a plurality of STAs, and the MIMO control information at least further includes an STA identity.

A MAC-layer sounding frame is designed mainly for the downlink, and is sent by a CAP to an STA for realizing a channel sounding function of MU-MIMO or closed-loop SU-MIMO. Since closed-loop SU-MIMO may be regarded as a particular case of MU-MIMO for only one user, only MU-MIMO is described in the embodiments of the invention.

At Step S02, after receiving the channel sounding frame, the STA responds to the CAP the channel information as requested by the CAP, according to the MIMO control information.

At Step S03, the CAP receives the channel information fed back by each STA, and sends data to the corresponding STA according to the channel information fed back.

If a CSI feedback is requested, the channel sounding frame needs to carry the MIMO control information.

Figure 3:
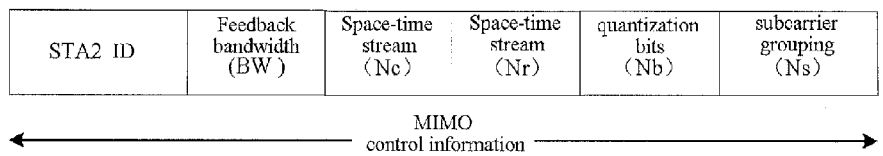
FIG. 3 is a schematic diagram showing the structure of MIMO control information according to the second embodiment of the invention.

If the channel information type as fed back is CSI matrix, the MIMO control information at Step S01 further includes: an index Nc used as the number of columns of a CSI matrix; an index Nr used as the number of rows of a CSI matrix; and quantization bit information of the real part and the imaginary part of each element in the CSI matrix. The structure of the MIMO control information is shown in FIG. 3. The definition of each field of the MIMO control information is shown in Table 2.

TABLE 2

| Field | Length (bits) | Description |
|---|---|---|
| feedback request type | 1 | representing the requested feedback type<br>0 represents a CSI matrix feedback<br>1 represents a codebook-based feedback |
| bandwidth fed back | 2 | representing the measured bandwidth of a channel<br>0 represents 20 MHz<br>1 represents 40 MHz<br>2 represents 80 MHz<br>3 reserved |
| index Nc | 3 | representing the number of columns of a matrix in the case of a CSI matrix:<br>0 represents Nc = 1, 1 represents Nc = 2, 2 represents Nc = 3<br>3 represents Nc = 4, 4 represents Nc = 5, 5 represents Nc = 6<br>6 represents Nc = 7, 7 represents Nc = 8<br>this field is reserved in the case of a codebook feedback |

TABLE 2-continued

| Field | Length (bits) | Description |
|---|---|---|
| index Nr | 3 | representing the number of rows of a matrix in the case of a CSI matrix: 0 represents Nr = 1, 1 represents Nr = 2, 2 represents Nr = 3 3 represents Nr = 4, 4 represents Nr = 5, 5 represents Nr = 6 6 represents Nr = 7, 7 represents Nr = 8 this field is reserved in the case of a codebook feedback |
| quantization bits (Nb) | 2 | indicating the size of each item in a codebook in the case of a CSI matrix feedback: 0 represents Nb = 4, 1 represents Nb = 5, 2 represents Nb = 6 3 represents Nb = 8 indicating quantization bits in a codebook in the case of a codebook feedback, and Nb = 8 |
| subcarrier grouping (Ns) | 2 | representing the number of carriers in a group: when a group includes 1 (Ng = 1) carriers, Ns = 0 (not grouped); when a group includes 2 (Ng = 2) carriers, Ns = 1; when a group includes 4 (Ng = 4) carriers, Ns = 2; when a group includes 8 (Ng = 8) carriers, Ns = 3; |

In the second embodiment of the invention, at Step S02, STAs with the same bandwidth capacity adopt the OFDMA mode for the feedback, and STAs with different bandwidth capacities adopt the TDMA mode for the feedback.

If there exist STAs with different capacities in an STA group related to a channel sounding frame, there are two feedback modes. On one hand, if STAs with different capacities are allowed to employ the OFDMA mode for feedback, the feedback may be performed according to requirements of the STA with the minimum capacity; for example, if the operating bandwidth of the CAP is 80 MHz and the CAP is equipped with 8 antennas, and the STA group of the channel sounding frame includes a User Equipment I with an 80 MHz receiving capacity and 4 antennas, a User Equipment II with a 20 MHz receiving capacity and 1 antenna, and a User Equipment III with a 40 MHz receiving capacity and 2 antennas, then the MIMO control information indicates that the channel bandwidth is 20 MHz and the antenna number is 1.

Figure 4:
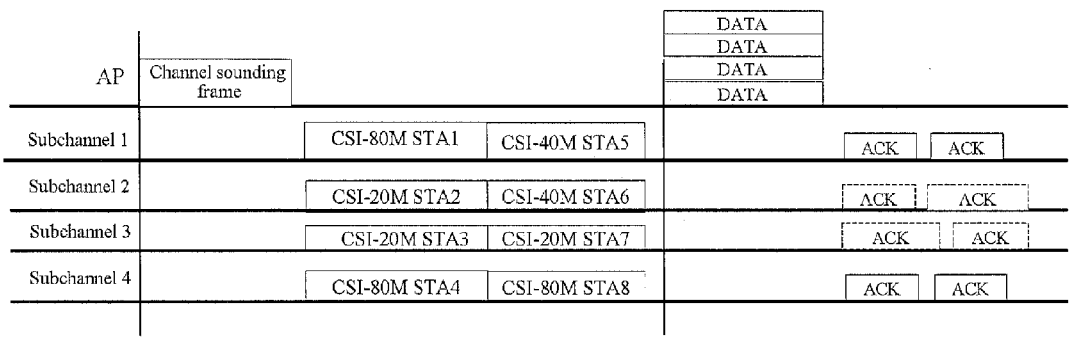
FIG. 4 is a timing diagram of uplink and downlink signals according to the second embodiment of the invention.

The uplink and downlink flow timing in the case that the system according to the second embodiment of the invention includes STAs with different capacities is shown in FIG. 4. A CAP first sends a channel sounding frame carrying MIMO control information of various STAs, and STAs with different capacities employ adopt the OFDMA mode for feedback.

Figure 6:
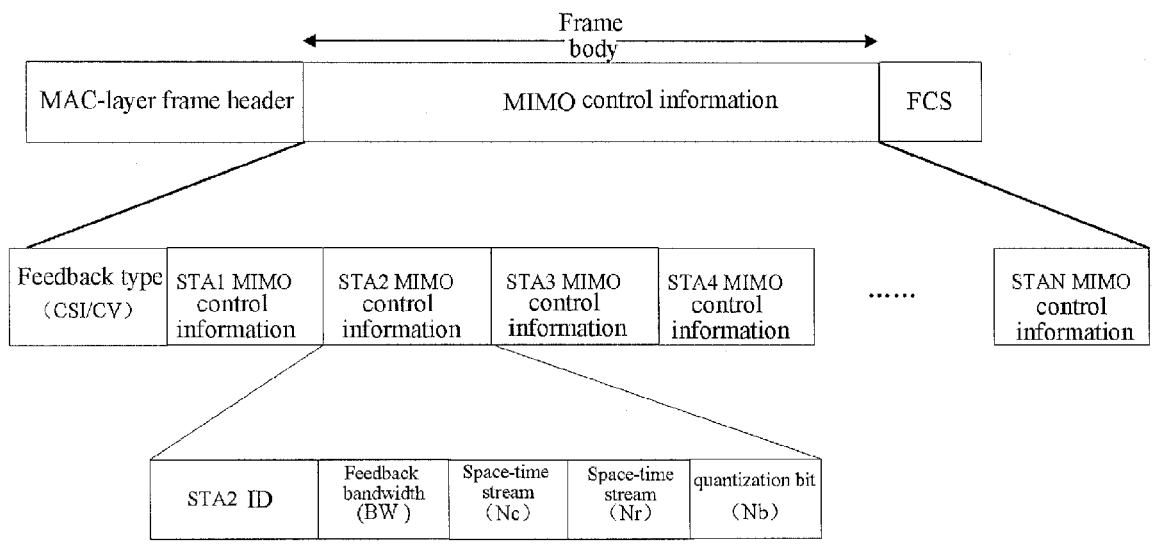
FIG. 6 is a structural representation of a channel sounding frame according to the second embodiment of the invention.

If a multi-user MU-MIMO channel sounding frame is sent by the CAP, the MIMO control information in the channel sounding frame contains MIMO control information of a plurality of STAs, as shown in FIG. 6.

Figure 5:
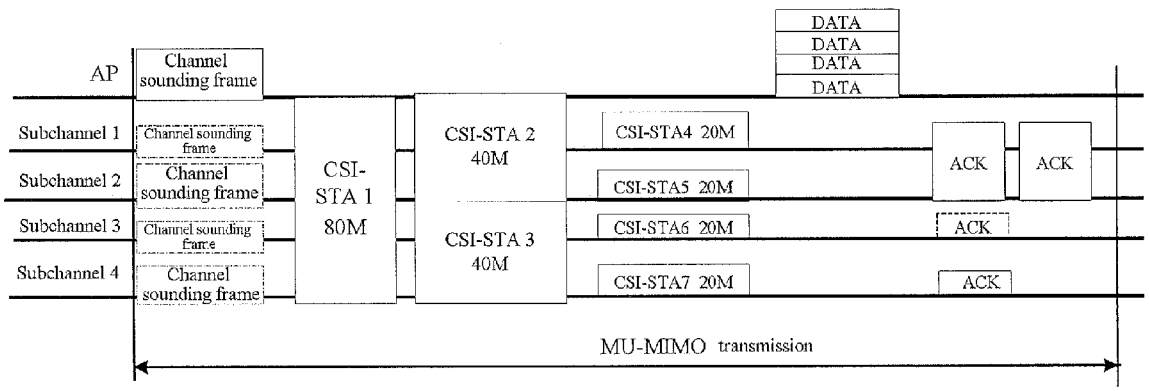
FIG. 5 is a timing diagram of uplink and downlink signals according to the second embodiment of the invention.

On the other hand, if merely STAs (User Equipments) with the same capacity are allowed to employ the OFDMA mode, STAs with different capacities employ the TDMA mode for feedback, as shown in FIG. 5. In such a case, the MIMO control information in the channel sounding frame indicates MIMO control fields of each STA, including an STA identity, a feedback bandwidth, a row number and a column number of the matrix, quantization bit number and subcarrier group, as shown in FIG. 6. Simplification may be made in a specific embodiment, for example, the STAs may be grouped according to their bandwidth capacities, and a uniform MIMO control information is designated for all. STAs with a 20 MHz operating bandwidth.

The MIMO feedback frame sent by an STA refers to a response of the STA receiving a feedback request.

Figure 10:
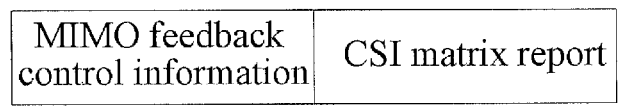
FIG. 10 is a structural representation showing the frame body of channel information of a MIMO feedback frame of a Channel State Information (CSI) matrix feedback type according to the third embodiment of the invention.
Figure 13:
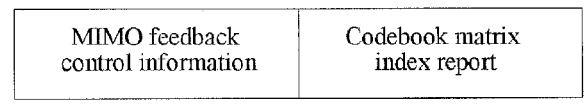
FIG. 13 is a structural representation showing the frame body of a MIMO feedback frame of a codebook index feedback type according to the third embodiment of the invention.

The MU-MIMO feedback type includes a CSI matrix feedback and a codebook feedback, and the frame body at the corresponding MAC layer is defined and shown in FIGS. 10 and 13.

CSI is represented in the form of a matrix, and CSI or a CSI matrix has the same meaning in the context.

In the second embodiment of the invention, the feedback type is generally a CSI matrix feedback or a codebook feedback; the channel information fed back by an STA is packaged and transferred in a MAC frame, which includes a MAC frame header and a frame body, and the frame body contains a CSI matrix report or a codebook matrix report.

The case where the feedback type is a CSI feedback is described below.

If the feedback type is a CSI matrix, the frame body fed back by an STA contains a CSI matrix report field, which contains channel quality information (CQI) of each receiving antenna and a CSI matrix of each data subcarrier or data subcarrier group.

The CSI matrix report field includes a channel state matrix element, and it is sorted according to the sequence number of the data subcarrier.

Generally, the sequence numbers of data subcarriers are sorted from a low frequency to a high frequency.

In the case of a 20 MHz bandwidth, the structure of the CSI report field is shown in Table 3;
In the case of a 40 MHz bandwidth, the structure of the CSI report field is shown in Table 4;
In the case of a 80 MHz bandwidth, the structure of the CSI report field is shown in Table 5.

TABLE 3

| Field | Meaning |
|---|---|
| CQI on receiving antenna 1 | average CQI on receiving antenna 1 |
| ... | |
| CQI on receiving antenna Nr | average CQI on receiving antenna Nr |
| CSI matrix of carrier −127 | CSI matrix |
| ... | |
| CSI matrix of carrier −1 | CSI matrix |
| CSI matrix of carrier 1 | CSI matrix |
| ... | |
| CSI matrix of carrier 127 | CSI matrix |

TABLE 4

| Field | meaning |
|---|---|
| CQI on receiving antenna 1 | average CQI on receiving antenna I |
| ... | |
| CQI on receiving antenna Nr | average CQI on receiving antenna Nr |

TABLE 4-continued

| Field | meaning |
|---|---|
| CSI matrix of carrier −255 | CSI matrix |
| CSI matrix of carrier −58 + Ng | CSI matrix |
| ... | |
| CSI matrix of carrier −2 | CSI matrix |
| CSI matrix of carrier 2 | CSI matrix |
| CSI matrix of carrier 2 + Ng | CSI matrix |
| ... | |
| CSI matrix of carrier 255 | CSI matrix |

TABLE 5

| Field | Meaning |
|---|---|
| CQI on receiving antenna 1 | average CQI on receiving antenna 1 |
| ... | |
| CQI on receiving antenna Nr | average CQI on receiving antenna Nr |
| CSI matrix of carrier −511 | CSI matrix |
| CSI matrix of carrier −58 + Ng | CSI matrix |
| ... | |
| CSI matrix of carrier −2 | CSI matrix |
| carrier 2CSI matrix of | CSI matrix |
| CSI matrix of carrier 2 + Ng | CSI matrix |
| ... | |
| CSI matrix of carrier 511 | CSI matrix |

The case where the feedback type is a codebook feedback is described below.

If the feedback type is a codebook feedback, the frame body fed back by the STA includes: CQI of each space-time stream, a codebook matrix identity of each data subcarrier or data subcarrier group, etc.

If the feedback request type carried in the channel sounding frame indicates a codebook feedback request, the contents of the frame body for the codebook feedback are shown in the following Tables 6, 7 and 8, which respectively represent the contents in each field of the frame body of a codebook feedback in the case of 20 MHz, 40 MHz and 80 MHz.

TABLE 6

| Field | Meaning |
|---|---|
| CQI on space-time stream 1 | average CQI on space-time stream 1 |
| ... | |
| CQI on space-time stream Nc | average CQI on space-time stream Nc |
| codebook matrix of carrier −127 | identity of codebook matrix |
| ... | |
| codebook matrix of carrier −1 | identity of codebook matrix |
| codebook matrix of carrier 1 | identity of codebook matrix |
| ... | identity of codebook matrix |
| codebook matrix of carrier 127 | identity of codebook matrix |

TABLE 7

| Field | Meaning |
|---|---|
| CQI on space-time stream 1 | average CQI on space-time stream 1 |
| ... | |
| CQI on space-time stream Nc | average CQI on space-time stream Nc |
| codebook matrix of carrier −255 | codebook matrix identity |
| codebook matrix of carrier −58 + Ng | codebook matrix identity |
| ... | |
| codebook matrix of carrier −2 | codebook matrix identity |
| codebook matrix of carrier 2 | codebook matrix identity |
| codebook matrix of carrier 2 + Ng | codebook matrix identity |
| ... | |
| codebook matrix of carrier 255 | codebook matrix identity |

TABLE 8

| Field | Meaning |
|---|---|
| CQI on space-time stream 1 | average CQI on space-time stream 1 |
| ... | |
| CQI on space-time stream Nc | average CQI on space-time stream Nc |
| codebook matrix of carrier −511 | codebook matrix identity |
| codebook matrix of carrier −58 + Ng | codebook matrix identity |
| ... | |
| codebook matrix of carrier −2 | codebook matrix identity |
| codebook matrix of carrier 2 | codebook matrix identity |
| codebook matrix of carrier 2 + Ng | codebook matrix identity |
| ... | |
| codebook matrix of carrier 511 | codebook matrix identity |

Figure 7:
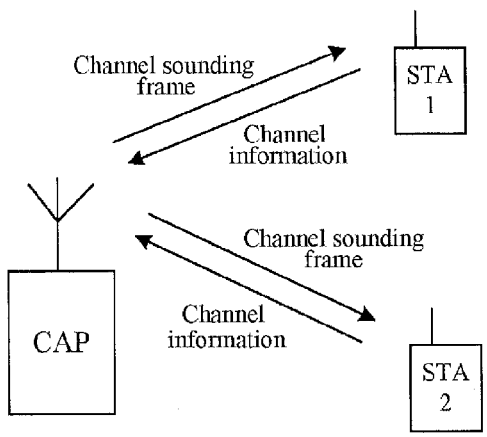
FIG. 7 is a schematic diagram of a wireless system for realizing MIMO according to the second embodiment of the invention.

Referring to FIG. 7, the second embodiment of the invention provides a system for realizing MIMO, including:

a CAP, adapted to send a channel sounding frame to specified user stations (STA1, STA2), where the sounding frame requests for a feedback of channel information, and the request carries MIMO control information includes a channel information type, channel bandwidth and subcarrier grouping information that are required to be fed back; where, if a MU-MIMO channel sounding frame is sent by the CAP, the MIMO control information contains MIMO control information of a plurality of STAs.

After receiving the sounding frame, the user stations (STA1, STA2) respond to the request of the CAP by feeding back channel information according to the MIMO control information.

The CAP receives the channel information fed back by each user station, determines the MIMO operating mode according to the channel information fed back, and sends data to the corresponding user station.

Preferably, user stations with the same capacity in the system according to the embodiments of the invention employ the OFDMA mode for feedback, and user stations with different capacities employ the TDMA mode for feedback.

For the system provided in the second embodiment of the invention, its operating principle and related operation flow are basically the same as those in the above embodiment of the method for realizing MIMO, and thus will not be described again here.

As can be seen, in the technical solution for realizing MIMO in medium-range and short-range wireless communication systems according to the invention, MIMO control information is carried in a channel sounding frame that is sent to a user station, to indicate each user station to feed back channel information, and then the MIMO operating mode is determined according to the channel information fed back, so that data may be sent to the corresponding user station. Thus, spectrum resources may be scheduled adaptively, and spectrum utilization and system performance may be improved.

A Third Embodiment

Figure 8:
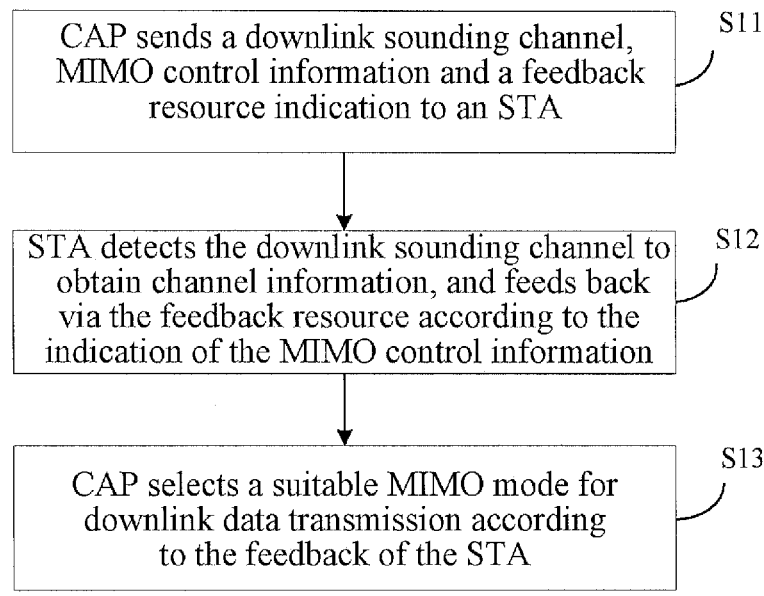
FIG. 8 is a flow chart of a method for realizing MIMO according to a third embodiment of the invention.
Figure 9:
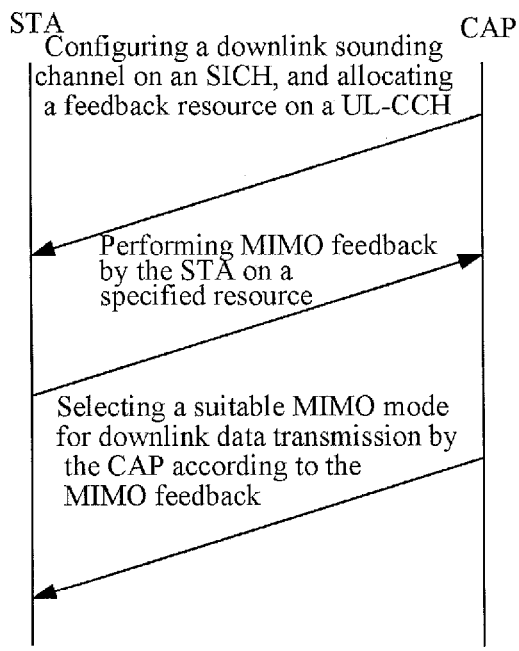
FIG. 9 is a flow chart of a method for realizing MIMO according to the third embodiment of the invention.

The third embodiment of the invention provides a method for realizing MIMO; specifically as shown in FIGS. 8 and 9, the method includes the following Steps S11-S13.

At Step S11, a CAP sends a downlink sounding channel, MIMO control information and a feedback resource indication to each STA. Here, the MIMO control information is used for requesting a feedback by the STA.

Preferably, the MIMO control information includes the requested feedback type and a feedback parameter; preferably, the MIMO control information may further include one or more of: a subchannel mapping indication, subcarrier grouping information and an STA identity (STAID).

The CAP may implement an overall schedule on the MIMO feedback of each STA by sending a downlink sounding channel, MIMO control information and a feedback resource indication.

Preferably, the type of feedback requested may be one of: a CSI matrix feedback, a Beamforming Matrix (BFM) feedback and a Codebook Matrix Index (CMI) feedback.

Preferably, if the type of feedback requested is a CSI feedback for Single User-MIMO or Multi User-MIMO, then the feedback parameter is an index Nr used as the number of rows of a feedback matrix (i.e. a CSI matrix). FIG. 9 shows the structure of the channel sounding frame.

Preferably, if the type of feedback requested is a BFM feedback for Single User-MIMO or Multi User-MIMO, then the feedback parameter is an index Nc used as the number of columns of a feedback matrix (i.e. a BFM matrix).

Preferably, if the type of feedback requested is a CMI feedback, it can be used for Single User-MIMO or multi-user MU-MIMO.

the control channel in advance a resource for the STA to perform channel feedback, which may be specifically realized by configuring a feedback resource indication in the control channel. The control channel may contain a plurality of feedback resource indications allocated to STAs; preferably, the feedback resource indication includes information such as STAID, indication of resource allocated, etc., and the indication of resource allocated specifically includes a symbol offset and duration. Preferably, the indication of resource allocated may further include a transmission mode which includes a Modulation and Coding Scheme (MCS) and a Number of Spatial Streams (Nss). The symbol offset is indicated by a starting OFDM symbol of a user resource block in the control channel, and the duration is indicated by the number of continuous OFDM symbols of a user resource block in the control channel. Preferably, the CAP configures the MIMO control information in the control channel in advance; that is, the MIMO control information is indicated via the control channel. The definition of the system information field is shown in Table 9.

TABLE 9

| Bits | Definition | Description |
|---|---|---|
| $b_7 b_6 \ldots b_0$ | 8 less significant bits of MAC address of the current CAP | CAP identity and scrambling seed |
| $b_{20} b_{19} \ldots b_8$ | Reserved | Reserved |
| $b_{23} b_{22} b_{21}$ | CAP antenna configuration | 000: one antenna |
| | | 001: two antennas |
| | | ... |
| | | 111: eight antennas |
| $b_{29} b_{28} \ldots b_{24}$ | control channel cycle indication | control channel cycle, ≤63 OFDM symbols |
| $b_{31} b_{30}$ | Reserved | Reserved |
| $b_{40} b_{39} \ldots b_{32}$ | downlink transmission channel cycle indication | downlink transmission channel cycle, ≤511 OFDM symbols |
| $b_{47} b_{46} \ldots b_{41}$ | Reserved | Reserved |
| $b_{56} b_{55} \ldots b_{48}$ | uplink transmission channel cycle indication | uplink transmission channel cycle, ≤511 OFDM symbols |
| $b_{63} b_{62} \ldots b_{57}$ | Reserved | Reserved |
| $b_{64}$ | downlink sounding channel configuration | 0: no downlink sounding channel<br>1: downlink sounding channel is configured |
| $b_{66} b_{65}$ | Reserved | Reserved |
| $b_{68} b_{67}$ | uplink sounding channel configuration | 00: no uplink sounding channel<br>01: uplink sounding channel occupies 1 OFDM symbol<br>10: uplink sounding channel occupies 2 OFDM symbols<br>11: uplink sounding channel occupies 4 OFDM symbols |
| $b_{70} b_{69}$ | uplink scheduling request channel configuration | 00: no scheduling request channel<br>01: scheduling request channel occupies 1 OFDM symbol<br>10: scheduling request channel occupies 2 OFDM symbols<br>11: scheduling request channel occupies 4 OFDM symbols |
| $b_{71}$ | uplink random access channel configuration | 0: no uplink random access channel<br>1: uplink random access channel occupies 1 OFDM symbol |
| $b_{75} b_{74} \ldots b_{72}$ | Reserved | Reserved |
| $b_{87} b_{86} \ldots b_{76}$ | frame label | 0~4095, count of frame sequence number |
| $b_{103} b_{102} \ldots b_{88}$ | CRC of 16 bits | CRC check protection |
| $b_{111} b_{110} \ldots b_{104}$ | Return-to-Zero bits of a convolution code encoder | nullify a convolution code ending state |

Preferably, before Step S11, the CAP may further prepare as follows.

On a physical layer, the CAP configures a downlink sounding channel in a system information channel of a physical frame in advance in order for sending a downlink sounding signal, to obtain a physical channel to allow an STA to accomplish downlink channel measurement. The CAP allocates in As shown in Table 9, a downlink sounding channel is configured by a bit $b_{64}$, a value 0 of which represents that no downlink sounding channel is configured, and a value 1 of which represents that a downlink sounding channel is configured.

The control channel is consisted of a plurality of unicast and broadcast schedule signalings. The uplink and downlink unicast schedule signaling fields are shown in Table 10.

TABLE 10

| Bit | Definition DL | UL |
|---|---|---|
| $b_0$ | $b_0 = 1$, downlink scheduling<br>$b_0 = 0$, uplink scheduling | |
| $b_1$ | $b_1 = 0$, time-division resource scheduling<br>$b_1 = 1$, Reserved | |
| $b_5 b_4 \ldots b_2$ | $[b_5 b_4 \ldots b_2]$, Bit Map indicating the location of a valid 20 MHz subchannel of the scheduling signaling | |
| $b_7 b_6$ | indicating a transmission mode of the current scheduling<br>00: open-loop SU-MIMO transmission<br>01: closed-loop SU-MIMO transmission<br>10: closed-loop MU-MIMO transmission (valid only when $b_0 = 1$)<br>11: Reserved | |
| $b_{16} b_{15} \ldots b_8$ | the starting OFDM symbol of a user resource block, with a field value from 1 to 511 | |
| $b_{23} b_{22} \ldots b_{17}$ | MCS and parallel Nss (≤4) indication of code word I (appendix A) | |
| $b_{32} b_{31} \ldots b_{24}$ | the number of continuous OFDM symbols of a user resource block, with a field value from 1 to 511 | |
| $b_{39} b_{38} \ldots b_{33}$ | MCS and parallel spatial stream number indication of code word II<br>1111111: the current transmission is SU-MIMO without code word II<br>1111110: the current transmission is 2-stream MU-MIMO<br>1111101: the current transmission is 3-stream MU-MIMO<br>1111100: the current transmission is 4-stream MU-MIMO<br>1111011: the current transmission is 5-stream MU-MIMO<br>1111010: the current transmission is 6-stream MU-MIMO<br>1111001: the current transmission is 7-stream MU-MIMO<br>1111000: the current transmission is 8-stream MU-MIMO<br>0000000~1100011: MCS and number of streams of SU-MIMO code word II (appendix A) | $b_{36} b_{35} \ldots b_{33}$: BitMap indicating a feedback subchannel of CQI, CSI, BFM or CMI<br>$b_{39} b_{38} b_{37}$: indicating the number of rows of a feedback matrix in the case of CSI feedback; and indicating the number of columns of a feedback matrix in the case of BFM feedback |
| $b_{42} b_{41} b_{40}$ | SU-MIMO: 000<br>MU-MIMO: index of the starting position of a spatial stream, with a field value from 0 to 7 | $b_{40} = 1$: requesting for CQI feedback<br>$b_{42} b_{41} = 01$: requesting for CSI feedback<br>$b_{42} b_{41} = 10$: requesting for BFM feedback<br>$b_{42} b_{41} = 11$: requesting for CMI feedback |
| $b_{44} b_{43}$ | 00: BCC code<br>01: LDPC code length 1 (1344 bits)<br>10: LDPC code length 2 (2688 bits)<br>11: LDPC code length 3 (5376 bits) | |
| $b_{45}$ | 0: time-domain demodulation pilot cycle 1 (long demodulation pilot cycle)<br>1: time-domain demodulation pilot cycle 2 (short demodulation pilot cycle) | |
| $b_{47} b_{46}$ | 00: frequency-domain demodulation pilot pattern 1 (DPI = 1)<br>01: frequency-domain demodulation pilot pattern 2 (DPI = 2)<br>10: frequency-domain demodulation pilot pattern 3 (DPI = 4)<br>11: Reserved | |
| $b_{54} b_{53} \ldots b_{48}$ | Reserved | |
| $b_{55}$ | 0: STBC transmission is not employed<br>1: STBC transmission is employed | |
| $b_{71} b_{70} \ldots b_{56}$ | CRC check protection and STA ID | |

As shown in Table 10, the starting OFDM symbols of a user resource block is indicated by bits $b_{16} b_{15} \ldots b_8$; and the number of continuous OFDM symbols of a user resource block is indicated by bits $b_{32} b_{31} \ldots b_{24}$.

Moreover, the MIMO control information is indicated in the control channel, specifically, the type of feedback requested is indicated by bits $b_{41}$ and $b_{42}$ as shown in Table 19, $b_{42} b_{41} = 01$ represents a request for a CSI feedback, $b_{42} b_{41} = 10$ represents a request for a BFM feedback, and $b_{42} b_{41} = 11$ represents a request for a CMI feedback. A subchannel indication is indicated by bits $b_{36} b_{35} \ldots b_{33}$, and BitMap indicates a CQI, CSI, BFM or CMI feedback subchannel.

The feedback parameter is indicated by bits $b_{39} b_{38} b_{37}$. In the case of a CSI feedback, bits $b_{39} b_{38} b_{37}$ indicate an index Nr used as the number of rows of a CSI feedback matrix; and in the case of BFM feedback, bits $b_{39} b_{38} b_{37}$ indicate an index Nc used as the number of columns of a BFM feedback matrix.

Preferably, to allocate a feedback resource to the STA, the CAP may allocate feedback resources to STAs with the same bandwidth capacity based on an OFDMA mode, and allocate feedback resources to STAs with different bandwidth capacities based on a TDMA mode.

At Step S12, the STA detects the downlink sounding channel to obtain the channel information, and feeds back via the feedback resource according to the indication of the MIMO control information.

Preferably, the channel information to be fed back may be packaged at the MAC layer into a MEMO feedback frame for sending, where the MIMO feedback frame is a MAC frame, and the MIMO feedback frame sent by an STA is a response of the STA after receiving a feedback request.

Preferably, the channel information fed back by the STA at least includes one of: a CSI matrix report, a BFM matrix report and a CMI report.

1) The case where the feedback type is a CSI feedback

If the feedback type is a CSI matrix, the frame body of the MIMO feedback frame contains CSI matrix report fields.

This CSI matrix report fields at least contain a CSI matrix of each data subcarrier or data subcarrier group.

Preferably, the CSI matrix report fields may further contain the CQI of each receiving antenna.

The CSI matrix report fields include channel state matrix elements, and are sorted according to the sequence numbers of the data subcarriers. Generally, the sequence numbers of data subcarrier are arranged from a low frequency to a high frequency.

The CSI_MIMO feedback frame is shown in Tables 11-13. When the system operates at an independent 20 MHz operating bandwidth, the structure of the CSI report fields is shown in Table 11; when the system operates at a continuous 40 MHz operating bandwidth, the CSI report fields are shown in Table 12, and Table 13 gives the CSI report fields when the system operates at a continuous 80 MHz operating bandwidth. Here, Nr represents the number of rows of a CSI matrix of the feedback request.

TABLE 11

| Field | Meaning |
| --- | --- |
| CQI on receiving antenna 1 | average CQI on receiving antenna 1 |
| ... | |
| CQI on receiving antenna Nr | average CQI on receiving antenna Nr |
| CSI matrix of subcarrier −115 | CSI matrix |
| ... | |
| CSI matrix of subcarrier −1 | CSI matrix |
| CSI matrix of subcarrier 1 | CSI matrix |
| CSI matrix of subcarrier 1 + FPl | CSI matrix |
| ... | |
| CSI matrix of subcarrier 115 | CSI matrix |

TABLE 12

| Field | Meaning |
| --- | --- |
| CQI on receiving antenna 1 | average CQI on receiving antenna 1 |
| ... | |
| CQI on receiving antenna Nr | average CQI on receiving antenna Nr |
| CSI matrix of subcarrier −243 | CSI matrix |
| ... | |
| CSI matrix of subcarrier −1 | CSI matrix |
| CSI matrix of subcarrier 1 | CSI matrix |
| CSI matrix of subcarrier 1 + FPl | CSI matrix |
| ... | |
| CSI matrix of subcarrier 243 | CSI matrix |

TABLE 13

| Field | Meaning |
| --- | --- |
| CQI on receiving antenna 1 | average CQI on receiving antenna 1 |
| ... | |
| CQI on receiving antenna Nr | average CQI on receiving antenna Nr |
| CSI matrix of subcarrier −499 | CSI matrix |
| ... | |
| CSI matrix of subcarrier −1 | CSI matrix |
| CSI matrix of subcarrier 1 | CSI matrix |
| CSI matrix of subcarrier 1 + FPl | CSI matrix |
| ... | |
| CSI matrix of subcarrier 499 | CSI matrix |

2) The case where the feedback type is a beamforming matrix feedback

If the feedback type is a beamforming matrix feedback, the frame body of the MAC frame contains beamforming matrix report fields. The beamforming matrix report field at least contains a beamforming matrix of each data subcarrier or data subcarrier group; preferably, this beamforming matrix report field may further contain the average CQI of each space-time stream.

The beamforming matrix report fields are shown in Tables 14-16. When the system operates at an independent 20 MHz operating bandwidth, the contents of the beamforming matrix report fields are shown in Table 14. Table 15 gives the beamforming matrix report fields when the system operates at a continuous 40 MHz operating bandwidth. When the system operates at a continuous 80 MHz operating bandwidth, the beamforming matrix report fields are shown in Table 16.

Here, Nc represents the number of columns of a BFM MIMO matrix of the feedback request.

TABLE 14

| Field | Meaning |
| --- | --- |
| CQI on space-time stream 1 | average CQI on space-time stream 1 |
| ... | |
| CQI on space-time stream Nc | average CQI on space-time stream Nc |
| beamforming matrix of subcarrier −115 | beamforming matrix |
| ... | |
| beamforming matrix of subcarrier −1 | beamforming matrix |
| beamforming matrix of subcarrier 1 | beamforming matrix |
| beamforming matrix of subcarrier 1 + FPI | beamforming matrix |
| ... | |
| beamforming matrix of subcarrier 115 | beamforming matrix |

TABLE 15

| Field | Meaning |
| --- | --- |
| CQI on space-time stream 1 | average CQI on space-time stream 1 |
| CQI on space-time stream Nc | average CQI on space-time stream Nc |
| beamforming matrix of subcarrier −243 | beamforming matrix |
| ... | |
| beamforming matrix of subcarrier −1 | beamforming matrix |
| beamforming matrix of subcarrier 1 | beamforming matrix |
| beamforming matrix of subcarrier 1 + FPI | beamforming matrix |
| ... | |
| beamforming matrix of subcarrier 243 | beamforming matrix |

TABLE 16

| Field | Meaning |
| --- | --- |
| CQI on space-time stream 1 | average CQI on space-time stream 1 |
| ... | |
| CQI on space-time stream Nc | average CQI on space-time stream Nc |
| beamforming matrix of subcarrier −499 | beamforming matrix |
| ... | |
| beamforming matrix of subcarrier −1 | beamforming matrix |
| beamforming matrix of subcarrier 1 | beamforming matrix |
| beamforming matrix of subcarrier 1 + FPI | beamforming matrix |
| ... | |
| beamforming matrix of subcarrier 499 | beamforming matrix |

3) The case where the feedback type is a codebook matrix index feedback

If the feedback type is a codebook matrix index feedback, the frame body of the MAC frame contains a codebook matrix index report fields. The codebook matrix index report field contains a codebook matrix index, etc., of each data subcarrier or data subcarrier group.

Preferably, the codebook matrix index report field may further contain the average CQI of each space-time stream.

The codebook matrix index report fields are shown in Tables 17, 18 and 19. When the system operates at an independent 20 MHz bandwidth, the contents of the codebook matrix index report fields are shown in Table 17. Table 18 gives codebook matrix index report fields when the system operates at a continuous 40 MHz bandwidth. When the system operates at a continuous 80 MHz bandwidth, the codebook matrix index report fields are shown in Table 19.

TABLE 17

| Field | Meaning |
|---|---|
| CQI on space-time stream 1 | average CQI on space-time stream 1 |
| ... | |
| CQI on space-time stream Nc | average CQI on space-time stream Nc |
| codebook matrix of subcarrier −115 | codebook matrix index |
| ... | |
| codebook matrix of subcarrier −1 | codebook matrix index |
| codebook matrix of subcarrier 1 | codebook matrix index |
| codebook matrix of subcarrier 1 + FPI | codebook matrix index |
| ... | |
| codebook matrix of subcarrier 115 | codebook matrix index |

TABLE 18

| Field | Meaning |
|---|---|
| CQI on space-time stream 1 | average CQI on space-time stream 1 |
| ... | |
| CQI on space-time stream Nc | average CQI on space-time stream Nc |
| codebook matrix of subcarrier −243 | codebook matrix index |
| ... | |
| codebook matrix of subcarrier −1 | codebook matrix index |
| codebook matrix of subcarrier 1 | codebook matrix index |

TABLE 18-continued

| Field | Meaning |
|---|---|
| codebook matrix of subcarrier 1 + FPI | codebook matrix index |
| ... | |
| codebook matrix of subcarrier 243 | codebook matrix index |

TABLE 19

| Field | Meaning |
|---|---|
| CQI on space-time stream 1 | average CQI on space-time stream 1 |
| ... | |
| CQI on space-time stream Nc | average CQI on space-time stream Nc |
| codebook matrix of subcarrier −499 | codebook matrix index |
| ... | |
| codebook matrix of subcarrier −1 | codebook matrix index |
| codebook matrix of subcarrier 1 | codebook matrix index |
| codebook matrix of subcarrier 1 + FPI | codebook matrix index |
| ... | |
| codebook matrix of subcarrier 499 | codebook matrix index |

Preferably, the STA feeds back not only the channel information, but also the MIMO feedback control information.

The MIMO feedback control information and the channel information fed back may be packaged together on the MAC layer into a MIMO feedback frame for sending. Here, the MIMO feedback frame is a MAC frame, and the MIMO feedback frame sent by the STA refers to a response of the STA after receiving a feedback request.

1) The case where the feedback type is a CSI feedback

If the feedback type is a CSI matrix, as shown in FIG. 10, the frame body of the MIMO feedback frame contains a MIMO feedback control information field and a CSI matrix report field.

Figure 11:
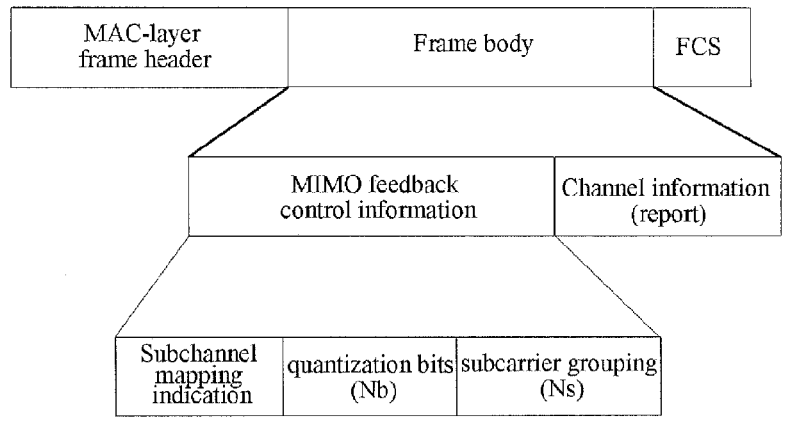
FIG. 11 is a structural representation of a MIMO feedback frame according to the third embodiment of the invention.

The definition of the MIMO feedback control information field is shown in Table 20. The MIMO feedback control information field includes one or more of: a subchannel mapping indication field, a quantization mode field and a subcarrier grouping (Ns) field. Preferably, FIG. 11 shows a situation in which all the above three fields are included. The subchannel mapping indication field is used for indicating the channel bandwidth and the specific subchannel of a MIMO feedback; the quantization mode field is used for indicating the quantization mode under each feedback mode; and the subcarrier grouping field is used for indicating the number of subcarriers in a group.

TABLE 20

| Field | Length (bits) | Description |
|---|---|---|
| subchannel mapping indication | 4 | representing a channel bandwidth and a specific subchannel of a MIMO feedback. |
| quantization mode | 2 | in the case of a CSI feedback, 00: CSI matrix quantization mode 1 01: CSI matrix quantization mode 2 10: CSI matrix quantization mode 3 11: CSI matrix quantization mode 4 in the case of a beamforming matrix feedback, 00: beamforming matrix quantization mode 1 01: beamforming matrix quantization mode 2 10: beamforming matrix quantization mode 3 11: beamforming matrix quantization mode 4 indicating the quantization bits in the codebook in the case of a codebook matrix index feedback, 00: 6-bit codebook; 1-3: reserved |
| subcarrier grouping (Ns) | 3 | representing the number of subcarriers in a group: 0: the group includes 1 (FPI = 1) subcarrier (not grouped); |

TABLE 20-continued

| Field | Length (bits) | Description |
|---|---|---|
| | | 1: the group includes 2 (FPl = 2) subcarriers;<br>2: the group includes 4 (FPl = 4) subcarriers;<br>3: the group includes 8 (FPl = 8) subcarriers;<br>4: the group includes 16 (FPl = 16) subcarriers;<br>5-7: reserved. |
| Reserved | 7 | 0 by default |

The specific description for the CSI matrix report field is the same as that in the third embodiment, thus reference may be made to Tables 11-13.

2) The case where the feedback type is a beamforming matrix feedback

Figure 12:
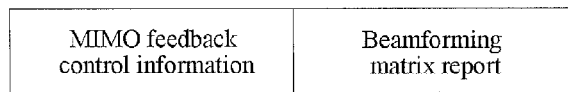
FIG. 12 is a structural representation showing the frame body of a MEMO feedback frame of a beamforming matrix feedback type according to the third embodiment of the invention.

If the feedback type is a beamforming matrix feedback, as shown in FIG. 12, the frame body of the MIMO feedback frame contains MIMO feedback control information and a beamforming matrix report field.

The description of the MIMO feedback control information field is the same as that described above.

The specific description of the beamforming matrix BFM report field is the same as that in the third embodiment, thus reference may be made to Tables 14-16.

3) The case where the feedback type is a codebook matrix index feedback

If the feedback type is a codebook matrix index feedback, as shown in FIG. 13, the frame body of the MIMO feedback frame contains MIMO feedback control information and a codebook matrix index report field.

The description of the MIMO feedback control information field is the same as that described above.

The specific description of the CMI report field is the same as that described above in this embodiment, thus reference may be made to Tables 17-19.

At Step S13), the CAP selects a suitable MIMO mode for downlink data transmission according to the feedback of the STA.

A Fourth Embodiment

The fourth embodiment of the invention provides a method for realizing MIMO; specifically, as shown in FIGS. 8 and 9, the method includes the following Steps S11-S13.

At Step S11, a CAP sends a downlink sounding channel, MIMO control information and a feedback resource indication to an STA.

The MIMO control information is used to request for a feedback from the STA. When the channel sounding frame is sent in a unicast mode, the MIMO control information at least includes the type of feedback requested and a feedback parameter. Preferably, the MIMO control information may further include one or more of: a subchannel mapping indication and subcarrier grouping information. Preferably, if the CAP sends an MU-MIMO channel sounding frame in a broadcast mode, the MIMO control information sent by the CAP contains the MIMO control information of a plurality of STAs, and at this point, the MIMO control information further includes an STA identity.

The CAP implements an overall schedule on the MIMO feedback of each STA by carrying the MIMO control information in a channel sounding frame.

Preferably, the type of feedback requested includes one of: a CSI matrix feedback, a BFM matrix feedback and a CMI feedback.

Figure 14:
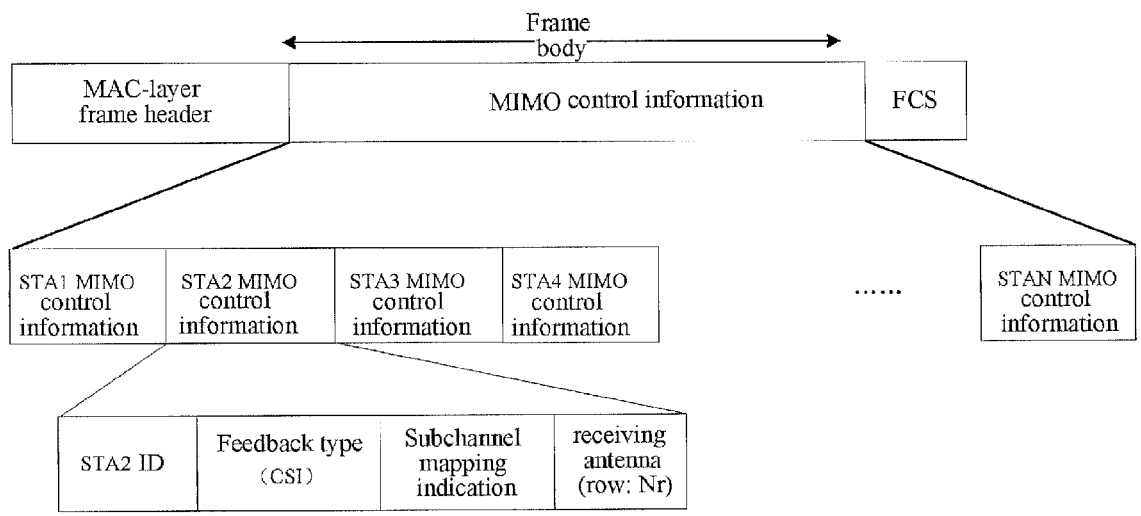
FIG. 14 is a structural representation of a channel sounding frame according to a fourth embodiment of the invention.

Preferably, if the type of feedback requested is a CSI feedback for Single User-MIMO or Multi User-MIMO, then the feedback parameter is an index Nr used as the number of rows of a feedback matrix (i.e. a CSI matrix). FIG. 14 shows the structure of the channel sounding frame.

Figure 15:
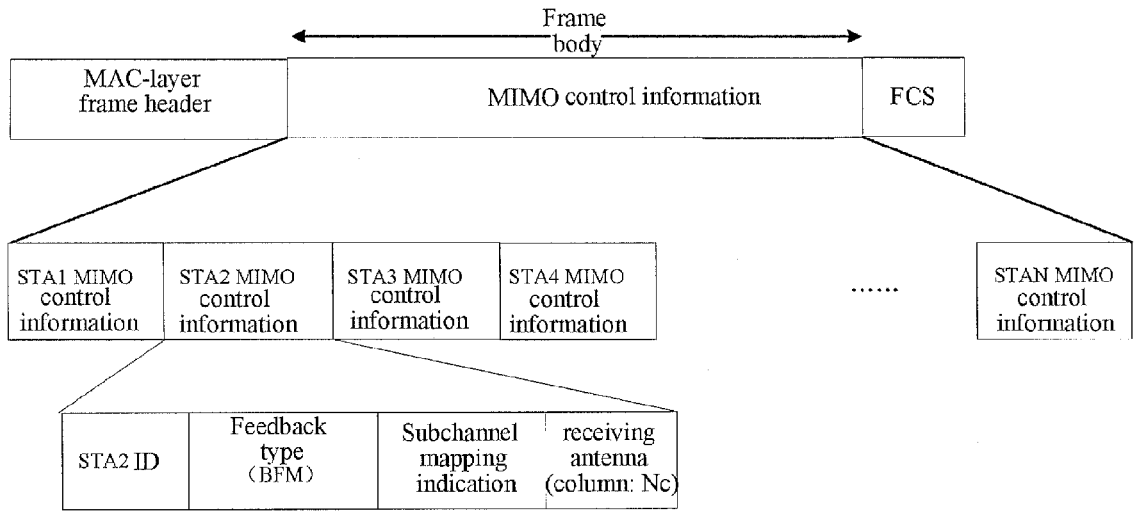
FIG. 15 is a structural representation of another channel sounding frame according to the fourth embodiment of the invention.

Preferably, if the type of feedback requested is a BFM feedback for Single User-MIMO or Multi User-MIMO, then the feedback parameter is an index Nc used as the number of columns of a feedback matrix (i.e. a BFM matrix). FIG. 15 shows the structure of the channel sounding frame.

Figure 16:
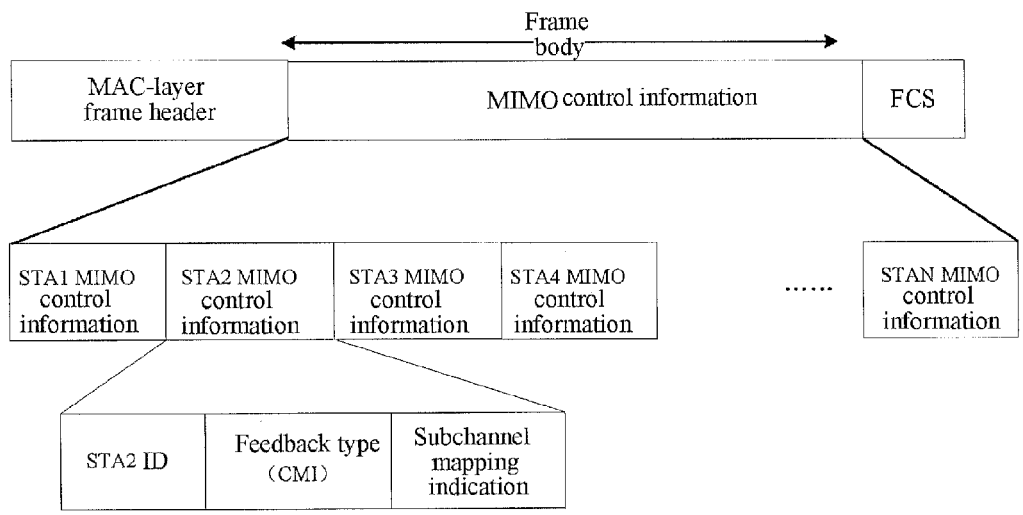
FIG. 16 is a structural representation of another channel sounding frame according to the fourth embodiment of the invention.

Preferably, if the type of feedback requested is a CMI feedback, it can be used for Single User-MIMO or multi user MU-MIMO. FIG. 16 shows the structure of the channel sounding frame.

Preferably, the present embodiment is different from the third embodiment in that the MIMO control information may be packaged on a MAC layer into a channel sounding frame and sent via a downlink transmission channel.

At Step S12, the STA detects the downlink sounding channel to obtain the channel information, and feeds back via the feedback resource according to the indication of the MIMO control information.

The specific description of the report information contained in the channel information fed back by the STA is the same as that in the third embodiment, and thus will not be described again here.

The specific description of the MIMO feedback control information fed back by the STA is the same as that in the third embodiment, and thus will not be described again here.

At Step S13, the CAP receives the channel information fed back by the STA, and selects a suitable MIMO operating mode for downlink data transmission according to the channel information.

A Fifth Embodiment

Figure 17:
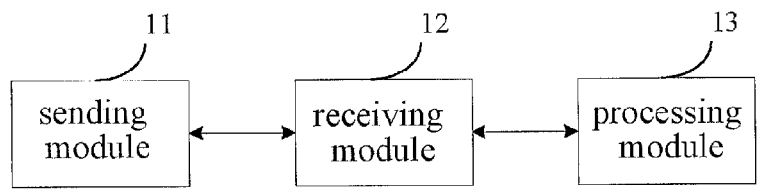
FIG. 17 is a structural representation of a central access point according to a fifth embodiment of the invention.

To implement the above method for realizing MIMO, the fifth embodiment of the invention further provides a Central Access Point, as shown in FIG. 17, which includes:

a sending module 11, for sending a downlink sounding channel, MIMO control information and a feedback resource indication to an STA;

a receiving module 12, for receiving a feedback from the STA; and a processing module 13, for selecting a suitable MIMO mode for downlink data transmission according to the feedback from the STA.

Preferably, the MIMO control information includes an identity ID of the STA.

Preferably, the MIMO control information includes the type of feedback requested and a feedback parameter.

Preferably, the type of feedback requested is a CSI feedback, and the feedback parameter is the number of rows of a CSI matrix.

In this case, the receiving module 12 is adapted to receive a CSI report fed back by the STA, and the CSI report contains the average CQI of each receiving antenna and a CSI matrix of each data subcarrier or data subcarrier group.

Preferably, the type of feedback requested is a beamforming matrix (BFM) feedback, and the feedback parameter is the number of columns of the BFM.

In this case, the receiving module 12 is adapted to receive a BFM report fed back by the STA, and the BFM report contains the average CQI of each space-time stream and a beamforming matrix of each data subcarrier or data subcarrier group.

Preferably, the type of feedback requested is a codebook matrix index (CMI) feedback.

In this case, the receiving module 12 is adapted to receive a CMI report fed back by the STA, and the CMI report contains the average CQI of each space-time stream and a codebook matrix identity of each data subcarrier or data subcarrier group.

Figure 18:
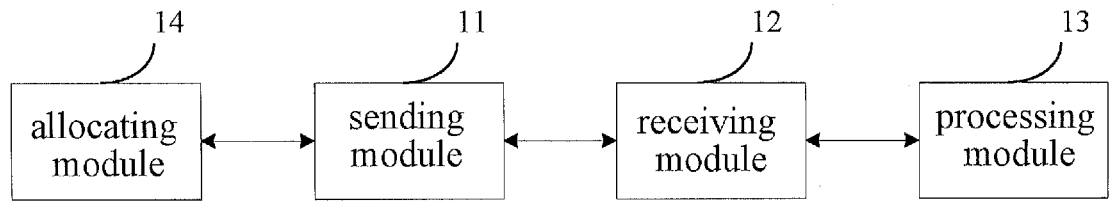
FIG. 18 is a structural representation of another central access point according to the fifth embodiment of the invention.

Preferably, as shown in FIG. 18, the Central Access Point further includes:

an allocating module 14, for allocating a feedback resource to the STA, where, feedback resources are allocated to STAs with the same bandwidth capacity based on an OFDMA mode, and feedback resources are allocated to STAs with different bandwidth capacities based on a TDMA mode.

The operating principle and related operation flow of the Central Access Point according to the fifth embodiment of the invention are basically the same as those in the method for realizing MIMO according to the above third or fourth embodiment, and thus will not be described again here.

A Sixth Embodiment

Figure 19:
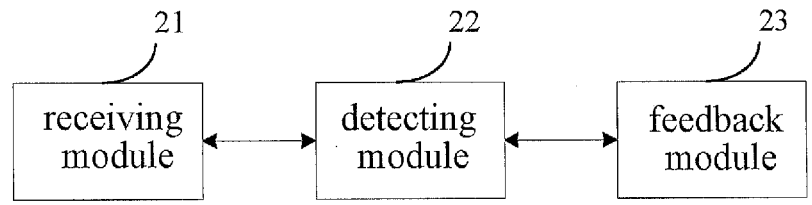
FIG. 19 is a structural representation of a station according to a sixth embodiment of the invention.

To implement the above method for realizing MIMO, the sixth embodiment of the invention further provides a station, as shown in FIG. 19, which includes:

a receiving module 21, for receiving from a CAP a data frame carrying a downlink sounding channel, MIMO control information and a feedback resource indication;

a detecting module 22, for detecting the downlink sounding channel to obtain channel information; and a feedback module 23, for feeding back via a feedback resource according to the indication of the MIMO control information.

Preferably, the MIMO control information includes an identity ID of the STA.

Preferably, the MIMO control information includes the type of feedback requested and a feedback parameter.

Preferably, the type of feedback requested is a CSI feedback, and the feedback parameter is the number of rows of a CSI matrix.

In this case, the feedback module 23 is adapted to feed back a CSI report, which contains the average CQI of each receiving antenna and a CSI matrix of each data subcarrier or data subcarrier group.

Preferably, when the type of feedback requested is a beamforming matrix (BFM) feedback, and the feedback parameter is the number of columns of the BFM.

In this case, the feedback module 23 is adapted to feed back a BFM report, which contains the average CQI of each space-time stream and a beamforming matrix of each data subcarrier or data subcarrier group.

Preferably, the type of feedback requested is a codebook matrix index (CMI) feedback.

In this case, the feedback module 23 is adapted to feed back a CMI report, which contains the average CQI of each space-time stream and a codebook matrix identity of each data subcarrier or data subcarrier group.

Preferably, the feedback module 23 is further adapted to feed back MIMO feedback control information.

The MIMO feedback control information includes one or more of: a subchannel mapping indication, for indicating the bandwidth of a MIMO feedback subchannel and the specific corresponding subchannel sequence number; a quantization mode, for indicating the quantization mode under each feedback mode; and subcarrier grouping, for indicating the number of subcarriers in a group.

The operating principle and related operation flow of the station according to the sixth embodiment of the invention are basically the same as those of the method for realizing MIMO according to the above third or fourth embodiment, and thus will not be described again here.

A Seventh Embodiment

Figure 20:
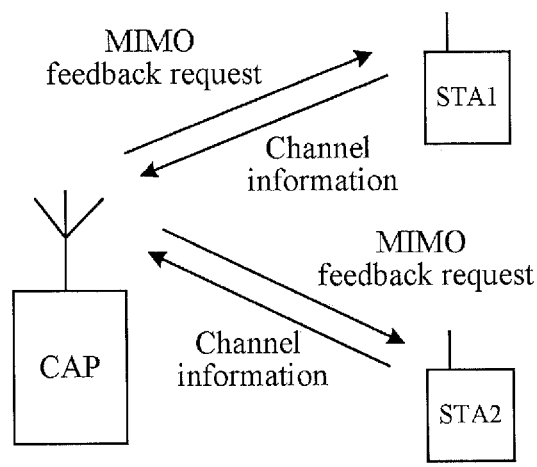
FIG. 20 is a schematic diagram of a wireless system for realizing MIMO according to a seventh embodiment of the invention.

The seventh embodiment of the invention further provides a system for realizing MIMO, which includes a Central Access Point according to the above fifth embodiment and a station according to the above sixth embodiment. FIG. 20 shows a schematic diagram including 2 STAs, for example.

The operating principle and related operation flow of the system according to the seventh embodiment of the invention are basically the same as those in the above embodiments of the method for realizing MIMO, the central access point and the station, and thus will not be described again here.

As can be seen, with the technical solutions for realizing MIMO according to the embodiments of the invention, a CAP can implement an overall schedule on channel resources, to enable an STA to further multiplex the space resources, thereby improving the spectrum utilization. The solutions of the invention allow the adaptive schedule of spectrum resources, thus improving spectrum utilization and system performance.

The embodiments of the invention have been illustrated by taking medium-range and short-range communication systems as an example; however, the invention is not limited to the medium-range and short-range communication systems, and other systems implemented by the method of the invention all fall into the scope of the invention.

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word. Additionally, any term "or" used in the claims or the specification intends to represent a "nonexclusive or".

What is claimed is:

1. A method for realizing Multi-Input Multi-Output (MIMO), comprising:
    sending, by a Central Access Point (CAP), a downlink channel sounding frame, MIMO control information and a feedback resource indication to a station (STA);
    detecting, by the STA, the downlink channel sounding frame to obtain channel information, and feeding back via the feedback resource according to indication of the MIMO control information; and
    selecting, by the CAP, a suitable MIMO mode for downlink data transmission according to the feedback of the STA, wherein the CAP allocates a feedback resource to the STA, wherein feedback resources are allocated to STAs with identical bandwidth capacity based on an OFDMA mode, and feedback resources are allocated to the STAs with different bandwidth capacities based on a TDMA mode.

2. The method of claim 1, wherein the MIMO control information includes an identity of the STA.

3. The method of claim 1, wherein the MIMO control information includes type of feedback requested and a feedback parameter.

4. The method of claim 3, wherein the type of feedback requested is a channel state information (CSI) feedback, the feedback parameter is a number of rows of a CSI matrix, and the STA feeds back a CSI report, which contains an average channel quality information (CQI) of each receiving antenna and the CSI matrix of each data subcarrier or data subcarrier group; or
    the type of feedback requested is a beamforming matrix feedback, the feedback parameter is number of columns of a beamforming matrix, and the STA feeds back a beamforming matrix report, which contains an average CQI of each space-time stream and a beamforming matrix of each data subcarrier or data subcarrier group; or
    the type of feedback requested is a codebook matrix index feedback, and the STA feeds back a beamforming matrix report, which contains an average CQI of each space-time stream and a codebook matrix identity of each data subcarrier or data subcarrier group.

5. The method of claim 1, wherein the STA feeds back MIMO feedback control information.

6. The method of claim 5, wherein the MIMO feedback control information comprises one or more of:
    a subchannel mapping indication, for indicating bandwidth of a MIMO feedback subchannel and the specific corresponding subchannel sequence number;
    a quantization mode, for indicating a quantization mode under each feedback mode; and
    subcarrier grouping, for indicating the number of subcarriers in a group.

7. A Central Access Point (CAP), comprising:
    a sending module configured to send a downlink channel sounding frame, Multi-Input Multi-Output (MIMO) control information and a feedback resource indication to a station (STA);
    a receiving module configured to receive a feedback of the STA;
    a processing module configured to select a suitable MIMO mode for downlink data transmission according to the feedback of the STA; and
    an allocating module configured to allocate a feedback resource to the STA, wherein, feedback resources are allocated to STAs with the same bandwidth capacity based on an OFDMA mode, and feedback resources are allocated to STAs with different bandwidth capacities based on a TDMA mode.

8. The CAP of claim 7, wherein the MIMO control information includes an identity of the STA.

9. The CAP of claim 7, wherein the MIMO control information includes a type of feedback requested and a feedback parameter.

10. The CAP of claim 9, wherein the type of feedback requested is a channel state information (CSI) feedback, the feedback parameter is number of rows of a CSI matrix, the receiving module receives a CSI report fed back by the STA, and the CSI report contains an average channel quality information (CQI) of each receiving antenna and a CSI matrix of each data subcarrier or data subcarrier group; or
    the type of feedback requested is a beamforming matrix feedback, the feedback parameter is number of columns of the beamforming matrix, the receiving module receives a beamforming matrix report fed back by the STA, and the beamforming matrix report contains an average CQI of each space-time stream and a beamforming matrix of each data subcarrier or data subcarrier group; or
    the type of feedback requested is a codebook matrix index feedback, the receiving module receives a codebook matrix index report fed back by the STA, and the codebook matrix index report contains an average CQI of each space-time stream and a codebook matrix identity of each data subcarrier or data subcarrier group.

* * * * *